Nov. 24, 1936.     E. J. HEFELE     2,062,129

LOOP ANTENNA

Filed Nov. 5, 1935

TO RADIO RECEIVER

INVENTOR.
Edward J. Hefele
BY
Samuel Ostrolenk
ATTORNEY.

Patented Nov. 24, 1936

2,062,129

UNITED STATES PATENT OFFICE 2,062,129

LOOP ANTENNA

Edward J. Hefele, Amityville, N. Y.

Application November 5, 1935, Serial No. 48,300

5 Claims. (Cl. 250—33)

This invention relates to loop antenna and, more particularly, relates to the reduction of the aerodynamic resistance of loop antennae employed in aircraft.

Loop antennae are used on aircraft for direction finding or homing purposes. They generally consist of a several turn coil wound upon a form eighteen inches in diameter. This coil is enclosed in a metallic tube which serves as a mechanical support and effectively shields the loop electrostatically. For low frequency operation, such as five hundred kilocycles for example, the coil would have about eighteen to twenty turns of anti-capacity wire of .005 inch diameter covered with low loss insulation of moisture proof cotton. The width of this coil would be approximately one quarter inch.

The coil is centrally spaced in a torroidal metallic enclosure which is a metal tube one inch to one and a half inches in cross sectional diameter. Measurements taken on the aerodynamic resistance of a typical one of such loops showed it to offer an aerodynamic resistance of 45.5 pounds at a velocity of two hundred miles per hour, requiring 24.3 horsepower to drive it through the air. I have found that in most instances, such metallically shielded loops have been used on aircraft merely because they offered a convenient method of mechanical construction and not because of any particular advantage due to shielding of the loop.

The voltage E induced in the loop antenna circuit by a field strength $e$ is expressed as $E=eH$ where H is the effective height of the antenna.

The effective height of a loop winding without shielding is given by the expression:

$$H = \tfrac{2}{3} f A n \times 10^{-12}$$

where H is the effective height in meters of the loop; $f$ is the frequency in cycles per second; A is the projected area of the loop in square centimeters; and $n$ is the number of turns in the loop.

This voltage E induced in the loop is not entirely available for the input of the amplifier of the direction finder receiver but is dependent upon the radio frequency resistance and the distributed capacitance of the loop antenna. In designing an efficient loop antenna, it is highly desirable to have the lowest values of resistance and distributed capacitance. Measurements at five hundred kilocycles showed the radio frequency resistance of the tubular shielded antenna hereinbefore described to be several hundred ohms. This relatively high radio frequency resistance is due to the use of the so-called anti-capacity wire and particularly to the closeness of the metallic shielding to the winding as is well known in the radio art. By employing number 32/38 stranded braided wire, the strands being individually enameled and the wire covered with waterproof cotton, corresponding measurements on this type of winding showed that the radio frequency resistance at five hundred kilocycles was reduced to one hundred ohms due to reduction in the skin effect as is well known. I have tried various metals, such as copper, brass, duralumin and aluminum in an effort to reduce the radio frequency resistance which is caused by the eddy currents induced in the shielding, but have found that the material of the loop shield had little effect. Measurements of the electrical constants of such a shielded loop showed it to have an inductance of 343 microhenries (limited by the distributed capacity); a distributed capacitance of 87 micro-microfarads; and a radio frequency resistance of 100 ohms at 500 kilocycles and 40 ohms at 350 kilocycles.

Further measurements made on this loop showed that its actual effective height is ⅙th of the theoretical effective height due to the effect of the close shielding.

The radio frequency resistance could be further reduced by increasing the cross-sectional diameter of the shielding which would increase the distance of the winding to the metal shield and thereby decrease the eddy current losses. However, since the aerodynamic resistance is proportional to the projected area of the loop tube, this diameter may not be increased without correspondingly reducing the diameter of the loop antenna for a predetermined aerodynamic resistance. Furthermore, a reduction in the loop diameter would reduce its effective height because of the reduction in its cross-sectional area A as noted in the above formula for H.

I have invented a loop antenna which is wound on an insulated tube of relatively small diameter and is placed in a stream-lined enclosure. The distributed capacity, and the radio frequency resistance is greatly reduced by avoiding the use of the close metal tubular shield, and the actual effective height of such a small loop may be made equal to or greater than the eighteen inch diameter tubular shield loop. The use of a stream-lined housing for such a small loop serves as a protective structure of minimum aerodynamic resistance.

Accordingly, an object of my invention is to provide a novel loop antenna for aircraft directional radio systems.

Another object of my invention is to provide a novel loop antenna for aircraft directional radio systems which has a minimum aerodynamic resistance.

Still another object of my invention is to provide a novel loop antenna for aircraft directional radio systems which has minimum radio frequency resistance and distributed capacitance.

A further object of my invention is to provide a very efficient loop antenna of relatively small size.

Still a further object of my invention is to provide a novel loop antenna enclosed in a streamlined housing.

These and other objects of my invention will become apparent in the description which is to follow in connection with the drawing, in which.

Figure 1:
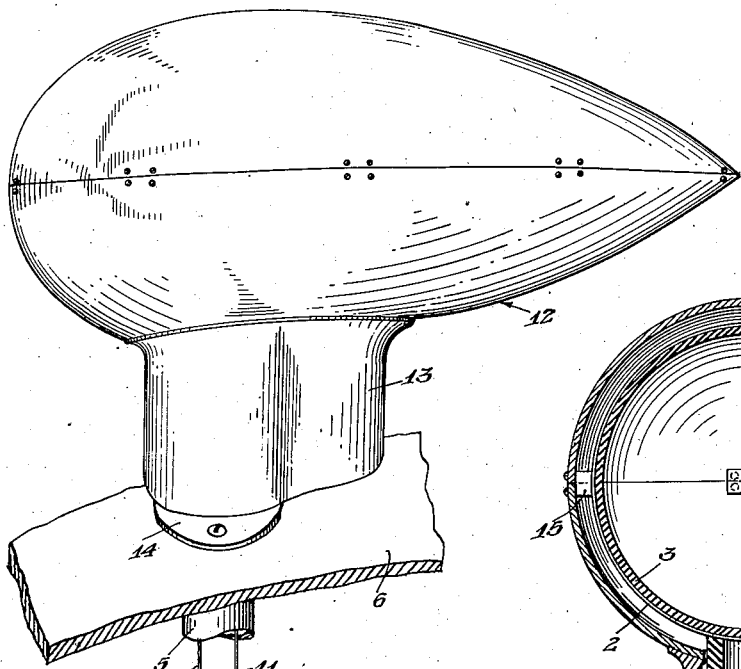
Figure 1 is an elevational view of the streamlined housing which encloses the loop antenna.

In carrying out my invention, I employ a coil which is made up of a winding 2 on tube 3 of insulating material having a diameter of 6 inches. The wire used for the winding should preferably be of the type having a minimum skin effect, such as a plurality of strands of thin wire, each strand being individually insulated from and interwoven with others. Such wire made of thirty-two strands of braided #38 B & S gauge enameled copper may be used. The inductance of the coil 1 is determined by the number of turns of the winding 2. The coil 1 is suitably mounted upon the insulating member 4 which is in turn affixed to the top end of the hollow shaft 5. The coil is mounted on the exterior of the vehicle, such as an aircraft 6. The shaft 5 projects through the aircraft frame 6 into the interior to the operator who may thus rotate it by means of a hand wheel (not shown) at the other end of the shaft 5.

The loop coil 1 is thus rotatably mounted external to the aircraft control cabin, and is manually operated as is well known in the art. The ends 7 and 7' of the loop winding 2 are connected to the terminal posts 8 and 9 mounted in the member 4. Connections 10 and 11 made to these terminal posts 8 and 9 are passed through the hollow shaft 5 and connect the loop winding 2 to the loop input of the radio receiver in the aircraft.

Figure 3:
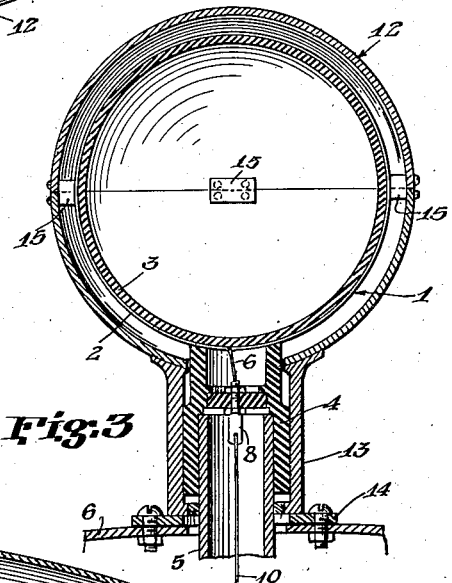
Figure 3 is the section 3—3 through Figure 2.
Figure 2:
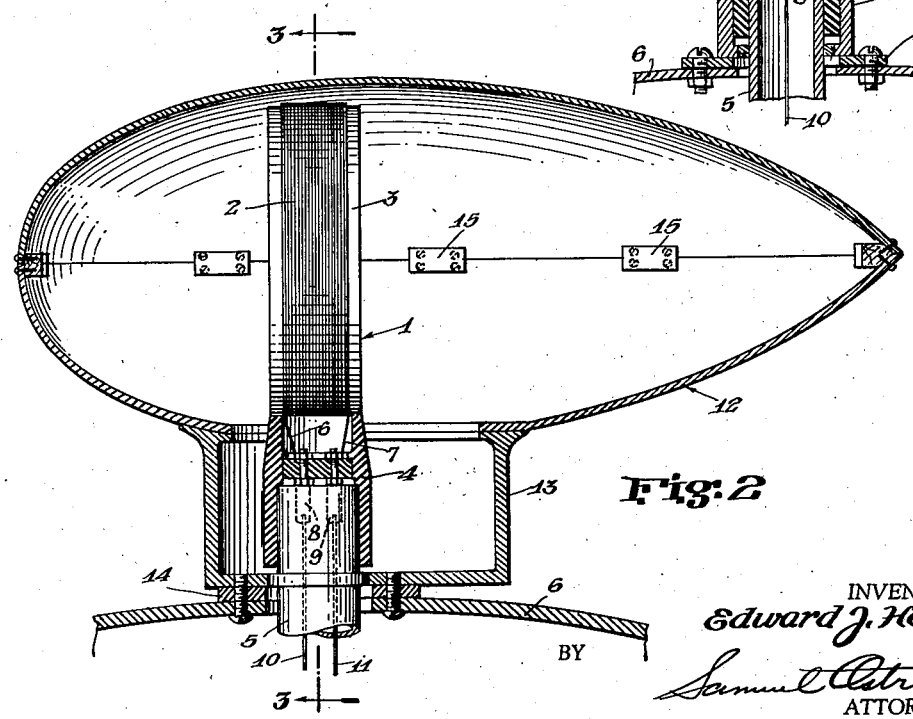
Figure 2 is a sectional elevation showing the position of the loop antenna in the stream lined housing.

The loop coil 1 may be exposed to the atmosphere outside the vehicle it is mounted upon. However, it is generally advantageous to enclose this coil with a structure to shield it from the effects of the wind pressure, atmosphere, weather conditions and mechanical injury. I therefore provide a structure 12 which encloses this loop coil 1 as shown in Figures 2 and 3. This structure 12 is rigidly mounted on a base 13 which is fixed on the frame 6 of the vehicle or aircraft by means of the flange 14 with suitable bolts or screws. Since the diameter of the loop antenna according to my invention is of the order of six inches, it is comparatively small so that the structure enclosing it will also have a correspondingly small diameter. This structure 12 is designed to have a minimum aerodynamic resistance in the direction of flight according to well known aerodynamic principles. The base 13 is also streamlined as is indicated in Figure 1. This housing structure for the loop coil is rigidly mounted upon the vehicle and the loop coil which it encloses is free to rotate within it with negligible torque since it is in still air. The streamlined structure 12 and 13 is preferably made of dielectric or insulating material. The elongated streamlined housing 12 consists of 2 portions which are fastened together by a plurality of small blocks 15 with screws as shown in Figures 2 and 3. Such an antenna construction has comparatively small radio frequency resistance and distributed capacitance as compared to the conventional metallic tubular loop, resulting in a much more efficient antenna system. This efficiency is made possible primarily by absence of the close metallic shield. Although I prefer to use a housing 12 of insulated material, a metal housing properly broken up by insulated material may be instead used to reduce the eddy current losses.

The shielded tubular antenna as hereinbefore set forth has an effective height of 1/6th that of the theoretical without shielding. The loop antenna according to my invention has an effective height almost equal to the theoretical. I can therefore accordingly employ a much smaller loop antenna to yield a predetermined signal input to the radio or direction finding receiver. I have found that a loop according to my invention, having a six inch diameter has an effective height which is fifty per cent greater than the conventional eighteen inch diameter metallic tubular loop and offers but 1/25th the aerodynamic resistance. Such an antenna offers about one pound resistance at two hundred miles per hour. This housing may be easily designed to withstand the rigors of a power dive by military aircraft which is very difficult to do with the tubing type loop. The streamlined loop according to my invention is extremely advantageous where more than one loop is to be mounted on an aircraft and is especially advantageous if these loops are coaxial.

As set forth above, the loop antenna of my invention is wound on a coil of the order of six inches in diameter. Such a loop is relatively small, and the electrostatic effect of nearby objects, particularly of metal parts, is maintained substantially constant as the loop is rotated in operation. The capacitance of the ordinary larger diameter loop to other objects which are usually at ground potential, changes with the position of the loop, and thereby affects the accuracy of the indicated bearings. The small loop of my invention greatly minimizes such capacitance variation, and avoids the necessity of direct or close metallic shielding.

The fixedly mounted streamlined housing 12 enclosing the rotatable loop coil 1 reduces to a very great degree the aerodynamic resistance of the combination of the loop coil 1 within the housing 12, as compared to the aerodynamic resistance of the loop coil 1 with no streamlined housing. The stream-lined housing 12 serves to even greater advantage in the operation of the loop antenna according to my invention because it shields the loop 1 from the wind at high velocity during operation on an aircraft in flight. The loop coil 1 is enclosed within the housing 12 wherein the air is at substantially zero velocity. The streamlined housing accordingly reduces the aerodynamic resistance of the small, highly efficient loop antenna 1 and provides for the loop antenna 1 to operate in still air even though traveling at a very high velocity. Since the streamlined structure 12 and 13 is rigidly mounted on the aircraft and is oriented thereon so that it always offers a minimum aerodynamic resistance under all conditions of flight, no effect is had on the aerodynamic resistance of the loop antenna structure according to my invention when the loop coil I is rotated for directional reception.

Although I have described the operation of the loop antenna hereinabove in connection with a hand wheel to be attached to the end of the hollow shaft 5, the loop antenna of my invention is particularly adaptable for remote control operation. Since the loop coil I is rotatable in an atmosphere of still air, there is no torque resisting its rotation due to any wind pressures during flight. Thus, the loop antenna is rotatable with negligible torque. The shaft 5 may be attached to the end of a remote control rotational drive mechanism which is well known to those skilled in the art.

Although I have described in detail one particular embodiment of a streamlined loop, many variations and modifications will present themselves to those skilled in the art, which fall within the broader spirit and scope of my invention, and accordingly, I do not intend to be limited, for example, by the shape or size of the loop coil or by the use of only one loop antenna within the streamlined housing or limited to any particular type of directional antenna construction, except as set forth in the appended claims.

This application is a continuation in part of my application Serial No. 43,189, filed October 2, 1935.

I claim:

1. In a directional radio system for a high velocity vehicle, a loop antenna system, said loop antenna being less than twelve inches in width, having electrical characteristics to produce an effective electrical height substantially of the order of the effective electrical height of a loop antenna having a width substantially greater than twelve inches, and a protective housing having streamline characteristics for said antenna, said housing having correspondingly small dimensions.

2. In a directional radio system for a high velocity vehicle, a loop antenna system, said loop antenna being of the order of six inches in width, having electrical characteristics to produce an effective electrical height substantially of the order of the effective electrical height of a loop antenna having a width of the order of eighteen inches, and a protective housing having streamline characteristics for said antenna, said housing having correspondingly small dimensions.

3. In a directional radio system for a high velocity vehicle, a loop antenna system supported exterior of said vehicle, said loop antenna being less than twelve inches in diameter and having a distributed capacitance and radio frequency resistance substantially less than the corresponding distributed capacitance and radio frequency resistance of a loop antenna of width substantially greater than twelve inches, and a protective housing having streamline charateristics enclosing said antenna with minimum aerodynamic resistance in the direction of flight of said vehicle, said housing having correspondingly small dimensions.

4. In a directional radio system for a high velocity vehicle, a loop antenna system supported exterior of said vehicle, said loop antenna being of the order of six inches in diameter and having electrical characteristics to produce an effective electrical height substantially of the order of the effective electrical height of a loop antenna of width of the order of eighteen inches, and a protective housing having streamline characteristics enclosing said antenna, said housing being fixed with respect to said vehicle with minimum aerodynamic resistance in the direction of flight of said vehicle, said housing having a cross section of the order of the diameter of the loop.

5. In a directional radio system for a high velocity vehicle, a loop antenna, said loop antenna being of the order of six inches in diameter and having electrical characteristics to produce an effective electrical height substantially of the order of the effective electrical height of a loop antenna of diameter of the order of eighteen inches, a protective housing having streamline characteristics for said antenna with minimum aerodynamic resistance in the direction of flight of said vehicle, and means for changing the orientation of said antenna within said housing.

EDWARD J. HEFELE.